(12) United States Patent
Li

(10) Patent No.: US 12,382,493 B2
(45) Date of Patent: Aug. 5, 2025

(54) SLOT FORMAT INDICATION METHOD AND APPARATUS

(71) Applicant: BEIJING XIAOMI MOBILE SOFTWARE CO., LTD., Beijing (CN)

(72) Inventor: Mingju Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 706 days.

(21) Appl. No.: 17/440,706

(22) PCT Filed: Mar. 26, 2019

(86) PCT No.: PCT/CN2019/079749
§ 371 (c)(1),
(2) Date: Sep. 17, 2021

(87) PCT Pub. No.: WO2020/191631
PCT Pub. Date: Oct. 1, 2020

(65) Prior Publication Data
US 2022/0174734 A1 Jun. 2, 2022

(51) Int. Cl.
*H04W 74/0808* (2024.01)
*H04W 72/044* (2023.01)
*H04W 72/23* (2023.01)

(52) U.S. Cl.
CPC ..... *H04W 74/0808* (2013.01); *H04W 72/044* (2013.01); *H04W 72/23* (2023.01)

(58) Field of Classification Search
None
See application file for complete search history.

(56) References Cited

U.S. PATENT DOCUMENTS

| | | | |
|---|---|---|---|
| 2017/0280481 A1* | 9/2017 | Stern-Berkowitz | H04W 74/004 |
| 2018/0098334 A1* | 4/2018 | Tie | H04W 72/12 |
| 2019/0268883 A1* | 8/2019 | Zhang | H04L 5/0094 |
| 2020/0221506 A1* | 7/2020 | Jeon | H04W 74/0833 |
| 2020/0267764 A1* | 8/2020 | Rastegardoost | H04W 72/0446 |
| 2022/0086885 A1* | 3/2022 | Zhu | H04W 72/1268 |

FOREIGN PATENT DOCUMENTS

| | | |
|---|---|---|
| CN | 108600974 A | 9/2018 |
| CN | 109075956 A | 12/2018 |
| CN | 109156014 A | 1/2019 |
| CN | 109309545 A | 2/2019 |

OTHER PUBLICATIONS

Extended European Search Report of EP Application No. 19921920.5 dated Mar. 23, 2022, (6p).
International Search Report of PCT/CN2019/079749 dated Dec. 24, 2019 with English translation (4p).

* cited by examiner

*Primary Examiner* — Xavier S Wong
(74) *Attorney, Agent, or Firm* — Arch & Lake LLP

(57) ABSTRACT

A slot format indication method and an apparatus thereof are provided. The method may include: performing Listen Before Talk (LBT) on an active bandwidth part (BWP) in a target serving cell corresponding to a terminal; determining target LBT bandwidth units (LBT BW units), corresponding channels of which are idle, from respective LBT bandwidth units included in the active BWP; and sending downlink control information (DCI) to the terminal, wherein the DCI comprises slot format indications (SFIs) of the target LBT BW units.

9 Claims, 6 Drawing Sheets

SLOT FORMAT INDICATION METHOD AND APPARATUS

CROSS-REFERENCE TO RELATED APPLICATION

The present application is the U.S. national phase application of International Application No. PCT/CN2019/079749, filed on Mar. 26, 2019, the contents of which are incorporated hereby in its entirety for all purposes.

TECHNICAL FIELD

The present disclosure relates to the field of communication technology, and in particular to a slot format indication method and apparatus.

BACKGROUND

A slot format is used to indicate how to use each symbol in a single slot, such as defining which symbols are used for an uplink and which symbols are used for a downlink. By applying the slot format or combining different slot formats in sequence, various different types of scheduling for a plurality of slots can be realized.

In a spectrum authorized by the New Radio (NR) technology, a configuration of a Radio Resource Control (RRC) signaling+a Downlink Control Information (DCI) signaling is supported by the slot format. RRC signaling gives a plurality of slot format combination identification (slotformatcombinationID) and their corresponding slot format combination. For example, when slotformatcombinationID is #0, its corresponding slot format combination contains X slot formats. For example, when X is 3, the corresponding slot format combination contains 3 slot formats, which are format #1, format #3, and format #6, respectively. At present, it is stipulated that a maximum value of X is 256, and a maximum value of slotformatcombinationID is 511. After using RRC signaling to inform the terminal of the plurality of slotformatcombinationID and the corresponding slot format combination, the base station use a DCI signaling to indicate the slotformatcombinationID therein, so that the terminal knows the slot formats of the plurality of slots.

SUMMARY

According to a first aspect of the disclosure, there is provided a slot format indication method. The slot format indication method is applied to a base station and may include performing Listen Before Talk (LBT) on an active bandwidth part (BWP) in a target serving cell corresponding to a terminal; determining target LBT bandwidth units (LBT BW units), corresponding channels of which are idle, from respective LBT bandwidth units included in the active BWP; and sending DCI to the terminal, where the DCI includes slot format indications (SFIs) of the target LBT BW units.

According to a second aspect of the disclosure, there is provided a slot format indication method. The slot format indication method is applied to a terminal and may include receiving DCI sent by a base station, where the DCI includes SFIs of target LBT BW units, and the target LBT BW units includes LBT BW units, corresponding channels of which are idle, from respective LBT BW units included in an active BWP in a target serving cell corresponding to the terminal; and determining numbers and SFIs of the target LBT BW units according to the DCI.

According to a third aspect of the disclosure, there is provided a slot format indication device. The slot format indication device is applied to a base station and may include a processor and memory for storing instructions executable by the processor. The processor is configured to: perform LBT on an active BWP in a target serving cell corresponding to a terminal; determine target LBT BW units, corresponding channels of which are idle, from respective LBT bandwidth units included in the active BWP; and send DCI to the terminal, where the DCI includes SFIs of the target LBT BW units.

According to a fourth aspect of the disclosure, there is provided a slot format indication device. The slot format indication device is applied to a terminal and may include a processor and memory for storing instructions executable by the processor. The processor is configured to: receive DCI sent by a base station, where the DCI includes SFIs of target LBT BW units, and the target LBT BW units includes LBT BW units, corresponding channels of which are idle, from respective LBT BW units included in an active BWP in a target serving cell corresponding to the terminal; and determine numbers and SFIs of the target LBT BW units according to the DCI.

According to a fifth aspect of the disclosure, there is provided computer-readable storage medium. At least one instruction is stored in the computer-readable storage medium, and the instruction is loaded and executed by a processor to implement operations in the slot format indication method according to the first aspect mentioned above.

According to a sixth aspect of the disclosure, there is provided computer-readable storage medium. At least one instruction is stored in the computer-readable storage medium, and the instruction is loaded and executed by a processor to implement operations in the slot format indication method according to the second aspect mentioned above.

It should be understood that the above general description and the following detailed description are only exemplary and explanatory, and do not limit the present disclosure.

BRIEF DESCRIPTION OF THE DRAWINGS

The drawings herein are incorporated into the specification and constitute a part of the specification, show embodiments that conform to the disclosure, and are used together with the specification to explain the principle of the disclosure.

DETAILED DESCRIPTION

Figures 1, 2:
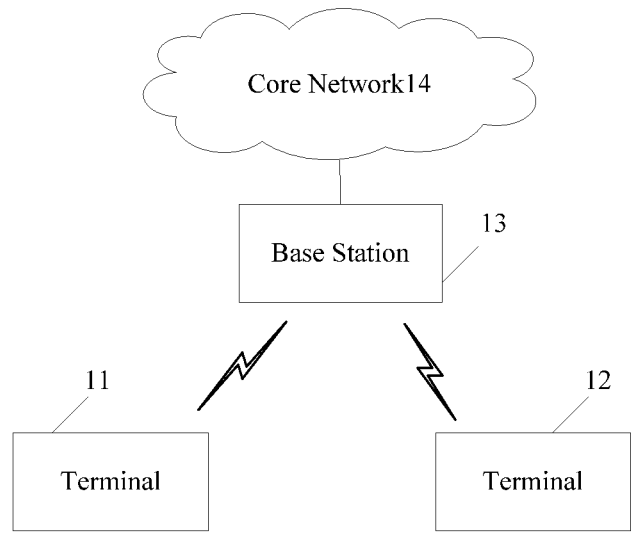
FIG. 1 is an application scenario diagram showing a slot format indication method according to an exemplary embodiment.
FIG. 2 is a flow chart showing a slot format indication method according to an exemplary embodiment.

The exemplary embodiments will be described in detail herein, and examples thereof are shown in the accompanying drawings. When the following description refers to the drawings, unless otherwise indicated, the same numbers in different drawings indicate the same or similar elements. The implementation manners described in the following exemplary embodiments do not represent all implementation manners consistent with the present disclosure. On the contrary, they are merely examples of apparatus and methods consistent with some aspects of the present disclosure as detailed in the appended claims.

In related technologies, in the Licensed Assisted Access (LAA), DCI signaling of the slot format indications (SFIs) is sent through a user group (GroupCommon) DCI of a primary cell (PCell). There are a plurality of slotformatcombinationID domains in the DCI signaling. Each domain corresponds to a component carrier (CC) of the base station, that is, a serving cell corresponding to a certain user equipment (UE). For example, suppose that the base station has 5 CCs in total, and UE #1 is configured with CC #0 (namely SCell #0), and CC #1 (namely SCell #1); UE #2 is configured with CC #3 (namely SCell #0), and CC #4 (namely SCell #1); then there are totally five slotformatcombinationIDs for indicating SFI, which are sent by the base station, and each slotformatcombinationID domain corresponds to one CC. The base station needs to inform UE #1 that the SFI of SCell #0 corresponds to an indication of a first slotformatcombinationID domain, and the SFI of SCell #1 corresponds to an indication of a second slotformatcombinationID domain. Meanwhile, the base station needs to inform UE #2 that the SFI of SCell #0 corresponds to an indication of a fourth slotformatcombinationID domain, and the SFI of SCell #1 corresponds to an indication of a fifth slotformatcombinationID domain. By using one groupcommon DCI, the base station at most can send the SFI of all CCs, and each UE go to a corresponding position to obtain the SFI information about its own Scell, according to the configured SCell. In LAA, the maximum bandwidth of each CC is 20 MHz, and the bandwidth unit (i.e., BW unit) of Listen Before Talk (LBT) is exactly 20 MHz. Therefore, there is only one LBT BW unit on one CC. However, in NR, for example, one CC may be 400 MHz, and each UE is configured with a plurality of bandwidth parts (BWP) on respective CCs, and bandwidths or frequency domain positions contained in different BWPs at least have one bandwidth or frequency domain position that is different from others. At present, each UE has only one active BWP on each CC. After performing LBT on this active BWP, the base station performs downlink transmission on part or all of the bandwidth of the active BWP, the LBT detection channels of which are idle, and a channel detection bandwidth unit of the LBT can also be 20 MHz, which can be smaller than the BWP bandwidth. Then, after the LBT detection, the base station needs to inform the UE that channels on channel detection bandwidth unit of which LBTs are idle, and how the SFI format indication thereof is defined and implemented is a technical problem to be solved urgently.

In order to solve the above problems, the embodiment of the present disclosure provides a slot format indication method, which is applied to a base station. The method includes: after performing Listen Before Talk (LBT) on an active bandwidth part (BWP) in a target serving cell corresponding to a terminal, determining target LBT bandwidth units (LBT BW unit), corresponding channels of which are idle, from among respective LBT channel detection bandwidth (BW) units included in the active BWP; sending downlink control information (DCI) to the terminal, wherein the DCI comprises slot format indications (SFIs) of the target LBT BW units. In the slot format indication method provided by the embodiment of the present disclosure, by means of indicating SFIs based on LBT channel detection bandwidth units, and notifying the terminal that channels corresponding to which of the LBT BW units are idle, the terminal is capable of obtaining explicit SFIs and applicable LBT BW units, and the clear indication of the slot format is realized, thus improving the reliability of the system.

Refer to FIG. 1, which shows an optional application scenario of the slot format indication method in the embodiment of the present disclosure, the application scenario shown in FIG. 1 includes: a terminal 11, a terminal 12, a base station 13 of a cellular network, and a core network 14. Among them, the cellular network can be a 4G or 5G network, etc. Both the terminal 11 and the terminal 12 establish a communication connection with the base station 13. The terminal 11 and the terminal 12 may include, for example, a smart phone, a tablet computer, a desktop computer, a laptop computer, a drone or a wearable device (such as a bracelet, a smart glass, etc.), etc. The application scenario shown in FIG. 1 is only an example of a possible application scenario of the technical scheme recorded in the embodiment of the present disclosure, and other application scenarios may include devices and networks not involved in FIG. 1. Based on the above analysis, the following specific embodiments are proposed.

FIG. 2 is a flow chart showing a slot format indication method according to an exemplary embodiment. The execution subject of the slot format indication method in the embodiment of the present disclosure may be a base station. As shown in FIG. 2, the method includes the following steps 201-202:

In step 201, after performing Listen Before Talk (LBT) on an active bandwidth part (BWP) in a target serving cell corresponding to a terminal, target LBT bandwidth units (LBT BW units) corresponding to idle channels are determined from among respective LBT channel detection bandwidth units (respective LBT BW units) included in the active BWP, that is, determining target LBT BW units whose channels are idle from among the respective LBT BW units included in the active BWP.

For example, the base station divides a bandwidth in the target serving cell corresponding to the terminal into N LBT channel detection bandwidth units. For example, if the target serving cell has a bandwidth of 100 MHz and the LBT channel detection bandwidth unit is 20 MHz, it is divided into five LBT BW Units. The numbers (Nos.) of the five LBT BW Units are LBT BW unit #0, LBT BW unit #1, LBT BW unit #2, LBT BW unit #3, and LBT BW unit #4. The base station configures bandwidth parts (BWP) for the terminal, so that the terminal can know which of LBT BW units are included in its active BWP. For example, the active BWP of UE #1 includes LBT BW unit #0, LBT BW unit #1, and LBT BW unit #2, and the active BWP of UE #2 includes LBT BW unit #2, LBT BW unit #3, and LBT BW unit #4.

After performing LBT on the active BWP in the target serving cell corresponding to the terminal, the base station determines the LBT BW units whose channels are idle from among respective LBT BW units included in the active BWP as the target LBT BW units.

In step 202, Downlink Control Information (DCI) is sent to the terminal, wherein the DCI includes slot format indications (SFIs) of the target LBT BW units.

For example, after performing LBT on the active BWP in the target serving cell corresponding to the terminal, the base station notifies the terminal that channels corresponding to which LBT BW units are idle and SFIs of the LBT BW units whose channels are idle. After receiving the DCI sent by the base station, the terminal determines, according to the DCI, numbers (Nos.) and SFIs of the target LBT BW units. Subsequently, the base station sends downlink data to the terminal on one or more LBT BW units with idle channels (i.e., on one or more LBT BW units whose channels are idle); the terminal receives the downlink data by using the LBT BW units with idle channels in the active BWP.

For example, before performing LBT on the active BWP in the target serving cell corresponding to the terminal, the base station sends an indication message to the terminal. The indication message indicates the bandwidth positions and the numbers (Nos.) of respective LBT BW units included in the active BWP in the target serving cell corresponding to the terminal. Optionally, the indication message may be a BWP configuration message of the BWP configured by the base station for the terminal.

In the technical scheme provided by the embodiments of the present disclosure, by means of indicating SFIs based on LBT channel detection bandwidth units, and notifying the terminal that channels corresponding to which of the LBT BW units are idle, the terminal is capable of obtaining explicit SFIs and applicable LBT BW units, and the clear indication of the slot format is realized, thus improving the reliability of the system.

Figure 3:
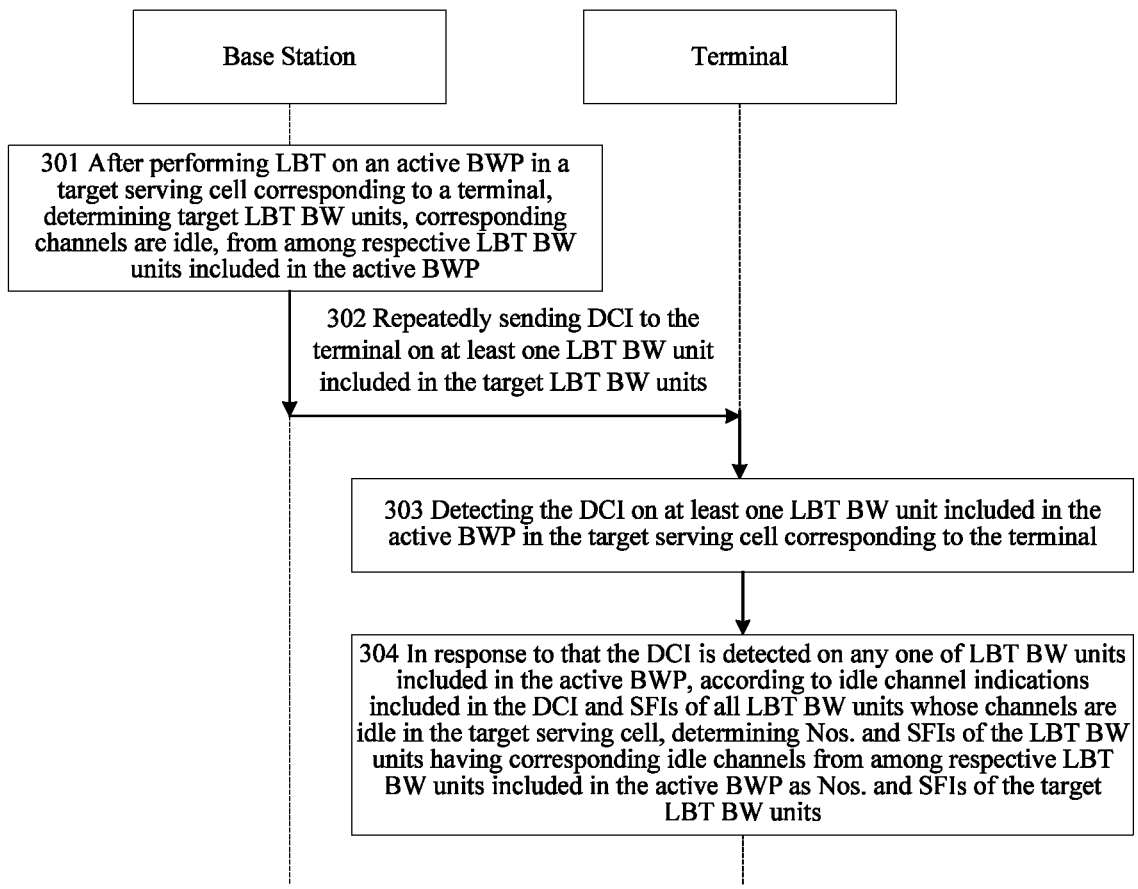
FIG. 3 is a flow chart showing a slot format indication method according to an exemplary embodiment.

FIG. 3 is a flow chart showing a slot format indication method according to an exemplary embodiment. In the embodiment of the present disclosure, the execution subject of the slot format indication method may be a base station and a terminal. As shown in FIG. 3, the method includes the following steps 301-304, wherein, for parts not described in detail in this embodiment, refer to the corresponding description of the embodiment in FIG. 2.

In step 301, after performing Listen Before Talk (LBT) on an active BWP in a target serving cell corresponding to a terminal, target LBT bandwidth units (LBT BW units) corresponding to idle channels are determined by the base station from among respective LBT BW units included in the active BWP, that is, the base station determining target LBT BW units whose channels are idle from among the respective LBT BW units included in the active BWP.

In step 302, Downlink Control Information (DCI) is repeatedly sent by the base station to the terminal on at least one LBT BW unit included in the target LBT BW units, wherein the DCI includes idle channel indications and SFIs of all LBT BW units, which channels are idle, in the target serving cell. The idle channel indications indicate whether channels respectively corresponding to all LBT BW units in the target serving cell are idle.

For example, the SFIs on all LBT BW units whose channels are idle may be the same or different. When the SFI formats on all LBT BW units in the target serving cell are the same, the slotformatcombinationID domain of the target serving cell only needs to indicate one SFI, and at the same time, some more bits are occupied. The number of occupied bits is the number of all LBT BW units in the target serving cell, that is, each LBT BW unit corresponds to one bit. For example, if said bit is displayed as 1, it means that the channel corresponding to the LBT BW unit is idle, and the SFI is the same as the indication of slotformatcombinationID. If said bit is displayed as 0, it means the channel corresponding to the LBT BW unit is busy. When the SFI formats on all LBT BW units in the target serving cell are different, the slotformatcombinationID domain of the target serving cell needs to indicate N types of SFIs, and N is the number of all LBT BW units whose channels are idle in the target serving cell. That is, each LBT BW unit with an idle channel corresponds to one type of SFI. For example, the M-th LBT BW unit among the N LBT BW units whose channels are idle corresponds to the M-th SFI among the N SFIs. At the same time, some more bits are occupied. The number of occupied bits is the number of all LBT BW units in the target serving cell, that is, each LBT BW unit corresponds to one bit. For example, if said bit is displayed as 1, it means that the channel corresponding to the LBT BW unit is idle; if said bit is displayed as 0, it means that the channel corresponding to the LBT BW unit is busy.

The DCI sent by the base station to the terminal indicates the SFI of all LBT BW units whose channels are idle in the target serving cell. The DCI can be sent on all LBT BW units whose channels are detected as idle, or only on a part of the LBT BW units of all LBT BW units whose channels are detected as idle. Each LBT BW unit is pre-configured with a control resource set (CORESET) for sending DCI. In this case, the terminal only needs to detect the DCI on one of the LBT BW units to know idle channel conditions and SFIs of all LBT BW units in the target serving cell.

In step 303, the DCI is detected, by the terminal, on at least one LBT BW unit included in the active BWP in the target serving cell corresponding to the terminal.

In step 304, in response to that the DCI is detected by the terminal on any one of LBT BW units included in the active BWP, according to the idle channel indications included in the DCI and SFIs of all LBT BW units whose channels are idle in the target serving cell, numbers (Nos.) and SFIs of the LBT BW units, corresponding channels are idle (i.e., the LBT BW units whose channels are idle), from among respective LBT BW units included in the active BWP are determined as numbers (Nos.) and SFIs of the target LBT BW units.

For example, in this case, the terminal may no longer need to detect the DCI sent on other LBT BW units.

In the technical solution provided by the embodiments of the present invention, by the base station sending the DCI signaling for indicating SFIs on one or more LBT channel detection bandwidth units being detected as having idle channels, wherein the DCI signaling carries idle channel indications, and the idle channel indications indicate whether channels respectively corresponding to all LBT BW units in the target serving cell are idle, the terminal is capable of obtaining explicit SFIs and applicable LBT BW units, and the clear indication of the slot formats can be realized, thus improving the reliability of the system.

Figure 4:
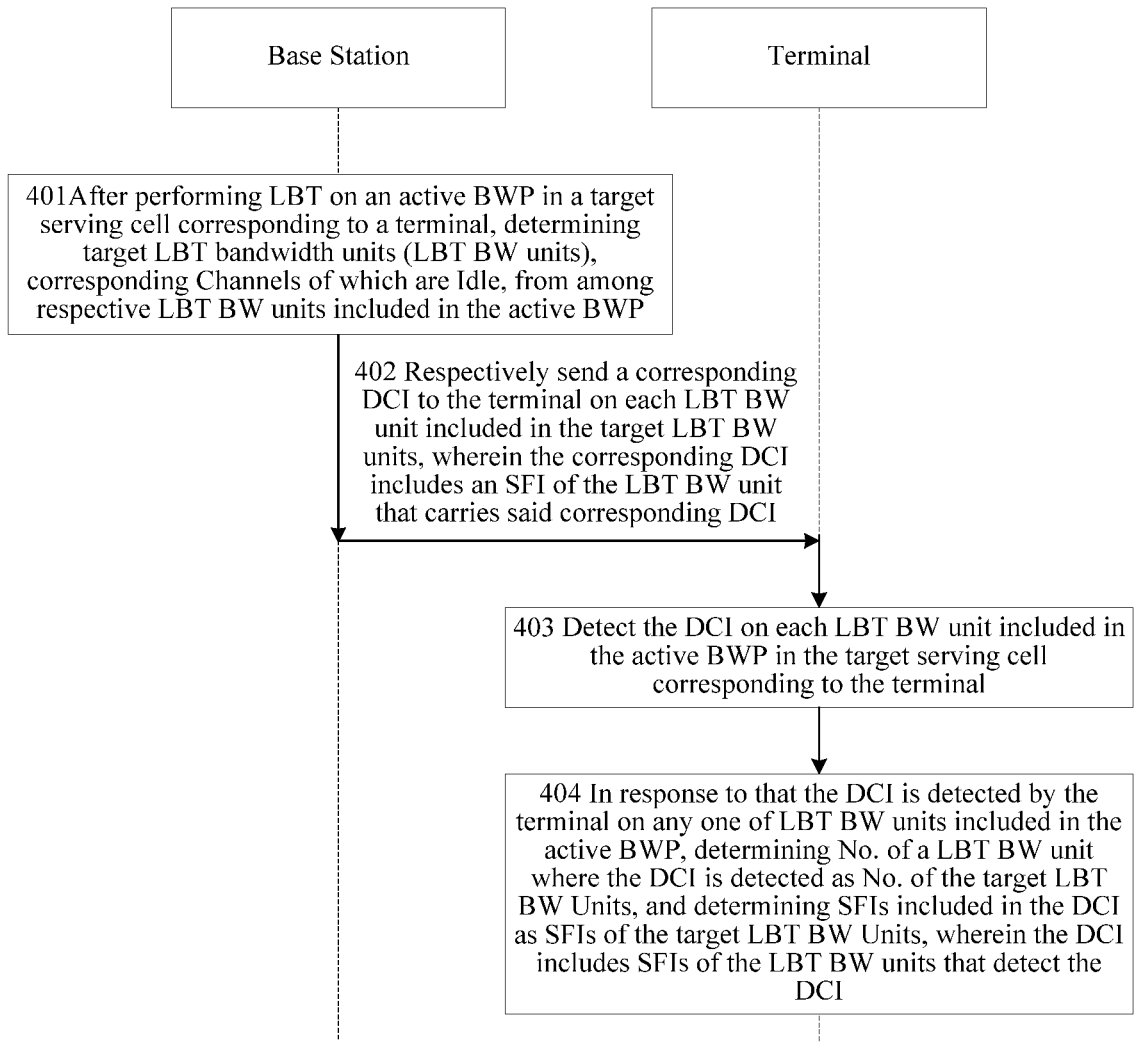
FIG. 4 is a flow chart showing a slot format indication method according to an exemplary embodiment.

FIG. 4 is a flow chart showing a slot format indication method according to an exemplary embodiment. In the embodiment of the present invention, the execution subject of the slot format indication method may be a base station and a terminal. As shown in FIG. 4, the method includes the following steps 401-404, where the parts that are not described in detail in this embodiment can refer to the corresponding description of the embodiment in FIG. 2.

In step 401, after performing Listen Before Talk (LBT) on an active BWP in a target serving cell corresponding to a terminal, target LBT bandwidth units (LBT BW units) corresponding to idle channels are determined by the base station from among respective LBT BW units included in the active BWP, that is, the base station determining target LBT BW units whose channels are idle from among the respective LBT BW units included in the active BWP.

In step 402, corresponding Downlink Control Information (DCI) is sent respectively by the base station to the terminal on each LBT BW unit included in the target LBT BW units, wherein the corresponding DCI includes an SFI of the LBT BW unit that carries said corresponding DCI.

For example, the SFIs on all LBT BW units whose channels are idle may be the same or different. Since the DCI only needs to indicate the SFI on the LBT BW unit that carries said DCI, only one type of SFI is needed to be indicated on all the LBT BW units in the target serving cell, and then only the SFI needs to be indicated in the DCI, and there is no need to indicate channels corresponding to which of LBT BW units are idle in the target serving cell, because the DCI can be sent on said LBT BW unit can means that the channels of said LBT BW units are idle, and the SFI indicated by using the DCI detected by said LBT BW unit is used. DCI must be sent on all LBT BW units whose channels are detected as idle; each LBT BW unit is preconfigured with CORESET for sending DCI. In this case, as long as the terminal can detect the DCI, the terminal knows that the LBT BW unit is detected as having the idle channel, and at the same time can also obtain the SFI of the LBT BW unit indicated in the DCI.

In step 403, the DCI is detected, by the terminal, on each LBT BW unit included in the active BWP in the target serving cell corresponding to the terminal.

In step 404, in response to that the DCI is detected by the terminal on any one LBT BW units included in the active BWP, number (No.) of the LBT BW unit where the DCI is detected is determined as number (No.) of the target LBT BW Units, and the SFIs included in the DCI is determined as SFIs of the target LBT BW Units, wherein the DCI includes the SFIs of the LBT BW units where the DCI is detected.

In this case, since each LBT BW unit only sends the SFI on its own bandwidth, the terminal needs to continue to detect the DCI on other LBT BW unit, and further obtain SFIs of the other LBT BW units.

In the technical solution provided by the embodiment of the present disclosure, the base station may send the DCI signaling for indicating SFI on each channel detection bandwidth unit which being detected as having the idle channel included in the active BWP in the target serving cell corresponding to the terminal. If DCI is detected by the terminal on a certain LBT channel detection bandwidth unit included in the active BWP, the channel corresponding to the LBT BW unit where the DCI is detected is idle, otherwise it is not idle, so that the terminal is capable of obtaining explicit SFIs and applicable LBT BW units, and the clear indication of the slot formats is realized, thus improving the reliability of the system.

In an embodiment, when the SFIs of all LBT BW units in the target serving cell are not completely same, the DCI includes SFIs of at least one LBT BW unit included in the target LBT BW units. The base station repeatedly sends DCI to the terminal on each LBT BW unit included in the target LBT BW units. The terminal detects DCI on at least one LBT BW unit included in the active BWP in the target serving cell corresponding to the terminal. When DCI is detected on any one LBT BW unit included in the active BWP, according to the idle channel indications included in the DCI and SFIs of all LBT BW units whose channels are idle in the target serving cell, numbers (Nos.) and SFIs of the LBT BW unit whose channels are idle, from among respective LBT BW units included in the active BWP are determined as numbers (Nos.) and SFIs of the target LBT BW units.

Figure 5:
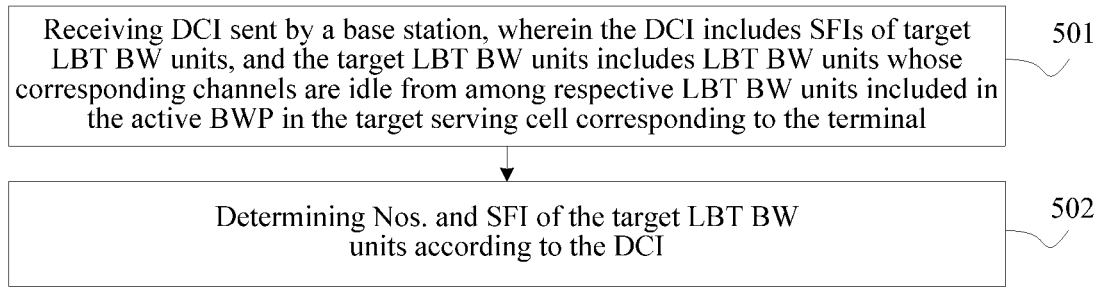
FIG. 5 is a flow chart showing a slot format indication method according to an exemplary embodiment.

FIG. 5 is a flow chart showing a slot format indication method according to an exemplary embodiment. The execution subject of the slot format indication method in the embodiment of the present invention may be a terminal. As shown in FIG. 5, the method includes the following steps 501-502:

In step 501, DCI sent by a base station is received, wherein the DCI includes slot format indications (SFIs) of target LBT BW units, and the target LBT BW units include LBT BW units whose corresponding channels are idle from among respective LBT BW units included in the active BWP in the target serving cell corresponding to the terminal.

For example, after performing LBT on the active BWP in the target serving cell corresponding to the terminal, the base station determines the target LBT BW units whose channels are idle from among the respective LBT BW units included in the active BWP, and the base station sends downlink control information (DCI) to the terminal. The downlink control information (DCI) includes slot format indications (SFIs) of the target LBT BW units. The terminal receives the DCI sent by the base station.

In step 502, numbers and SFIs of the target LBT BW units are determined according to the DCI.

For example, after receiving the DCI sent by the base station, the terminal determines numbers and the SFIs of the target LBT BW units according to the DCI. Subsequently, the base station sends downlink data to the terminal on one or more LBT BW units with idle channels and the terminal receives the downlink data by using the LBT BW units having idle channels in the active BWP.

In the technical solution provided by the embodiment of the present disclosure, by the base station indicating the SFIs based on LBT channel detection bandwidth units, and notifying the terminal that which LBT BW units having idle channels, the terminal is capable of obtaining explicit SFIs and applicable LBT BW units, and the clear indication of the slot formats can be realized, thus improving the reliability of the system.

The following are apparatus embodiments of the present disclosure, which can be used to implement the method embodiments of the present disclosure, and the parts of the apparatus embodiments that are not described in detail can refer to the method embodiments.

Figure 6:
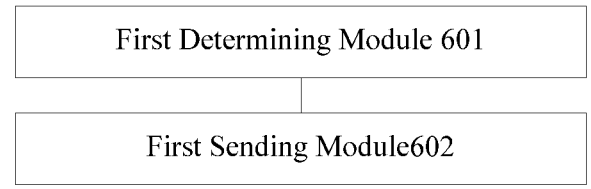
FIG. 6 is a block diagram showing a slot format indication apparatus according to an exemplary embodiment.

FIG. 6 is a block diagram showing a slot format indication apparatus according to an exemplary embodiment, and the apparatus may be applied to a base station. Referring to FIG. 6, the slot format indication apparatus includes: a first determining module 601 and a first sending module 602.

The determining module 601 is configured to after performing Listen Before Talk (LBT) on an active bandwidth part (BWP) in a target serving cell corresponding to a terminal, determine target LBT bandwidth units (LBT BW units), corresponding channels of which are idle, from among respective LBT bandwidth units included in the active BWP.

The first sending module 602 is configured to send downlink control information (DCI) to the terminal, wherein the DCI comprises slot format indications (SFIs) of the target LBT BW units.

In the slot format indication apparatus provided by the embodiment of the present disclosure, by means of indicating SFIs based on an LBT channel detection bandwidth units, and notifying the terminal that channels corresponding to which of the LBT BW units are idle, the terminal is capable of obtaining explicit SFIs and applicable LBT BW units, and the clear indication of the slot format is realized, thus improving the reliability of the system.

In some embodiments, the first sending module 602 is configured to repeatedly send the DCI to the terminal on at least one LBT BW unit included in the target LBT BW units; wherein the DCI comprises idle channel indications and SFIs of all LBT BW units, corresponding channels of which are idle, in the target serving cell, and wherein the idle channel indications indicate whether channels respectively corresponding to all LBT BW units in the target serving cell are idle or not.

In some embodiments, the first sending module 602 is configured to respectively send a corresponding DCI to the terminal on each LBT BW unit included in the target LBT BW units, wherein the corresponding DCI comprises an SFI of a LBT BW unit that carries said corresponding DCI.

Figure 7:
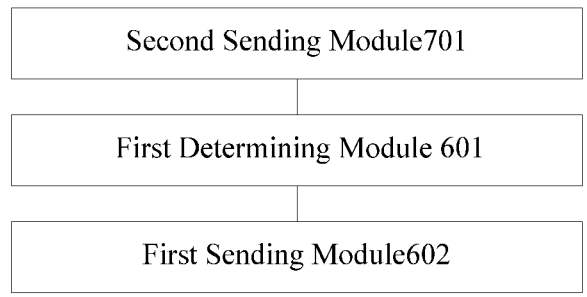
FIG. 7 is a block diagram showing a slot format indication apparatus according to an exemplary embodiment.

In some embodiments, as shown in FIG. 7, the time slot format indication apparatus shown in FIG. 6 may further include a second sending module 701, which is configured to before performing LBT on the active BWP in the target serving cell corresponding to the terminal, send an indication message to the terminal, wherein the indication message indicates bandwidth positions and numbers (Nos.) of respective LBT BW units included in the active BWP in the target serving cell corresponding to the terminal.

Figure 8:
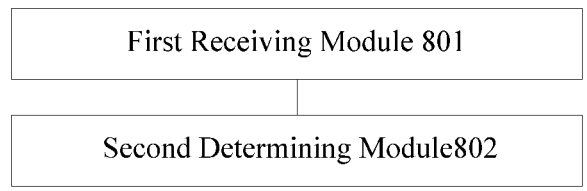
FIG. 8 is a block diagram showing a slot format indication apparatus according to an exemplary embodiment.

FIG. 8 is a block diagram showing a slot format indication apparatus according to an exemplary embodiment. The apparatus can be applied to a terminal. Referring to FIG. 8, the slot format indication apparatus includes: a first receiving module 801 and a second determining module 802.

The first receiving module 801 is configured to receive downlink control information (DCI) sent by a base station, wherein the DCI comprises slot format indications (SFIs) of target LBT bandwidth units (LBT BW units), and the target LBT BW units comprises LBT BW units, corresponding channels of which are idle, from among respective LBT BW units included in an active bandwidth part (BWP) in a target serving cell corresponding to the terminal.

The second determining module 802 is configured to determine numbers and SFIs of the target LBT BW units according to the DCI.

In the slot format indication apparatus provided by the embodiment of the present disclosure, by means of indicating SFIs based on LBT channel detection bandwidth units, and notifying the terminal that channels corresponding to which of the LBT BW units are idle, the terminal is capable of obtaining explicit SFIs and applicable LBT BW units, and the clear indication of the slot format is realized, thus improving the reliability of the system.

In some embodiments, the first receiving module 801 is configured to detect the DCI on at least one LBT BW unit included in the active BWP in the target serving cell corresponding to the terminal, wherein the DCI comprises idle channel indications and SFIs of all LBT BWs, corresponding channels of which are idle, in the target serving cell, and the idle channel indications are used to characterize whether channels respectively corresponding to all LBT BW units in the target serving cell are idle or not.

In some embodiments, the second determining module 802 is configured to: in response to that the DCI is detected on any one of LBT BW units included in the active BWP, according to the idle channel indications and the SFIs included in the DCI, determine numbers (Nos.) and SFIs of the LBT BW units, corresponding channels of which are idle, from among respective LBT BW units included in the active BWP as numbers and an SFIs of the target LBT BW units.

In some embodiments, the first receiving module 801 is configured to detect the DCI on each LBT BW unit included in the active BWP in the target serving cell corresponding to the terminal.

The second determining module 802 is configured to: in response to that the DCI is detected on any one of LBT BW units included in the active BWP, determine number (No.) of a LBT BW unit that detects the DCI as a number (No.) of the target LBT BW units and determine SFIs included in the DCI as SFIs of the target LBT BW units, wherein the DCI comprises the SFIs of the LBT BW units that detect the DCI.

Figure 9:
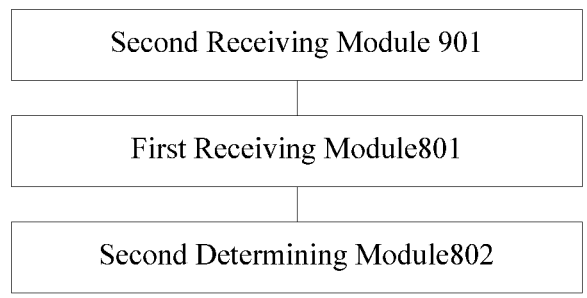
FIG. 9 is a block diagram showing a slot format indication apparatus according to an exemplary embodiment.

In an embodiment, as shown in FIG. 9, the slot format indication apparatus shown in FIG. 8 may further include a second receiving module 901, which is configured to receive an indication message sent by the base station, wherein the indication message indicates bandwidth positions and numbers of respective LBT BW units included in the active BWP in the target serving cell corresponding to the terminal.

Figure 10:
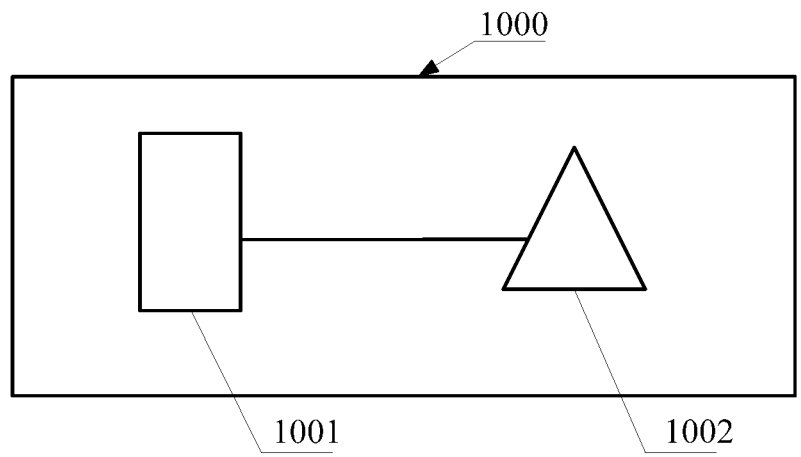
FIG. 10 is a block diagram showing a slot format indication apparatus according to an exemplary embodiment.

FIG. 10 is a block diagram showing a slot format indication device 1000 according to an exemplary embodiment, which is applied to a base station; the time slot format indication device 1000 includes a processor 1001 and memory 1002 for storing instructions executable by the processor; wherein the processor 1001 is configured to: after performing Listen Before Talk (LBT) on an active bandwidth part (BWP) in a target serving cell corresponding to a terminal, determining target LBT bandwidth units (LBT BW units), corresponding channels of which are idle, from among respective LBT bandwidth units included in the active BWP; and sending downlink control information (DCI) to the terminal, wherein the DCI comprises slot format indications (SFIs) of the target LBT BW units.

In some embodiments, the processor 1001 is further configured to repeatedly send the DCI to the terminal on at least one LBT BW unit included in the target LBT BW units; wherein the DCI comprises idle channel indications and SFIs of all LBT BW units, corresponding channels of which are idle, in the target serving cell, and wherein the idle channel indications are used to characterize whether channels respectively corresponding to all LBT BW units in the target serving cell are idle or not.

In some embodiments, the processor 1001 is further configured to respectively send a corresponding DCI to the terminal on each LBT BW unit included in the target LBT BW units, wherein the corresponding DCI comprises an SFI of a LBT BW unit that carries said corresponding DCI.

In some embodiments, the processor 1001 is further configured to before performing LBT on the active BWP in the target serving cell corresponding to the terminal, sending an indication message to the terminal, wherein the indication message indicates bandwidth positions and numbers of respective LBT BW units included in the active BWP in the target serving cell corresponding to the terminal.

Figure 11:
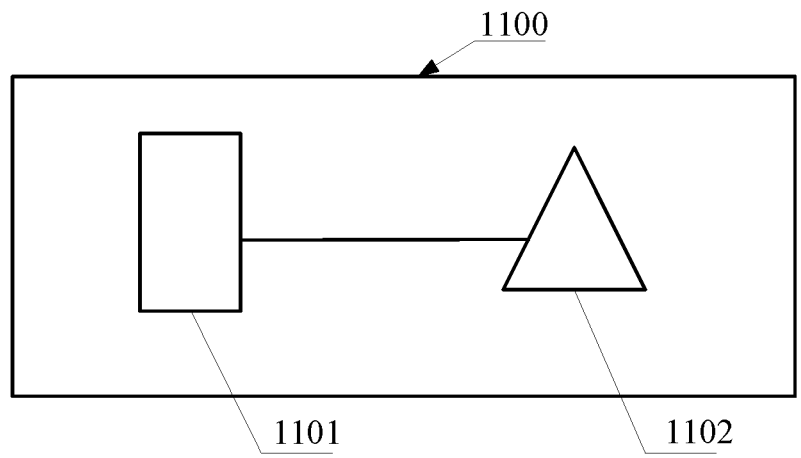
FIG. 11 is a block diagram showing a slot format indication apparatus according to an exemplary embodiment.

FIG. 11 is a block diagram showing a slot format indication device 1100 according to an exemplary embodiment, which is applied to a base station; the time slot format indication device 1100 includes a processor 1101 and memory 1102 for storing instructions executable by the processor; wherein the processor 1101 is configured to: receive downlink control information (DCI) sent by a base station, wherein the DCI comprises slot format indications (SFIs) of target LBT bandwidth units (LBT BW units), and the target LBT BW units comprises LBT BW units, corresponding channels of which are idle, from among respective LBT BW units included in an active bandwidth part (BWP) in a target serving cell corresponding to the terminal; and determine numbers and SFIs of the target LBT BW units according to the DCI.

In some embodiments, the processor 1101 is further configured to detect the DCI on at least one LBT BW unit included in the active BWP in the target serving cell corresponding to the terminal; wherein the DCI comprises idle channel indications and SFIs of all LBT BWs, corresponding channels of which are idle, in the target serving cell, and the idle channel indications are used to characterize whether channels respectively corresponding to all LBT BW units in the target serving cell are idle or not; and in response to that the DCI is detected on any one of LBT BW units included in the active BWP, according to the idle channel indications and the SFIs included in the DCI, determine numbers and SFIs of the LBT BW units, corresponding channels of which are idle, from among respective LBT BW units included in the active BWP as numbers and an SFIs of the target LBT BW units.

In some embodiments, the processor 1101 is further configured to detect the DCI on each LBT BW unit included in the active BWP in the target serving cell corresponding to the terminal; and in response to that the DCI is detected on any one of LBT BW units included in the active BWP, determine number (No.) of a LBT BW unit that detects the DCI as number (No.) of the target LBT BW units and determining SFIs included in the DCI as SFIs of the target LBT BW units, wherein, the DCI comprises the SFIs of the LBT BW units that detect the DCI.

In some embodiments, the processor 1101 is further configured to receive an indication message sent by the base station, wherein the indication message indicates bandwidth positions and numbers of respective LBT BW units included in the active BWP in the target serving cell corresponding to the terminal.

Regarding the apparatus in the foregoing embodiment, the specific manner in which each module performs operation has been described in detail in the embodiment of the method, and detailed description will not be given here.

Figure 12:
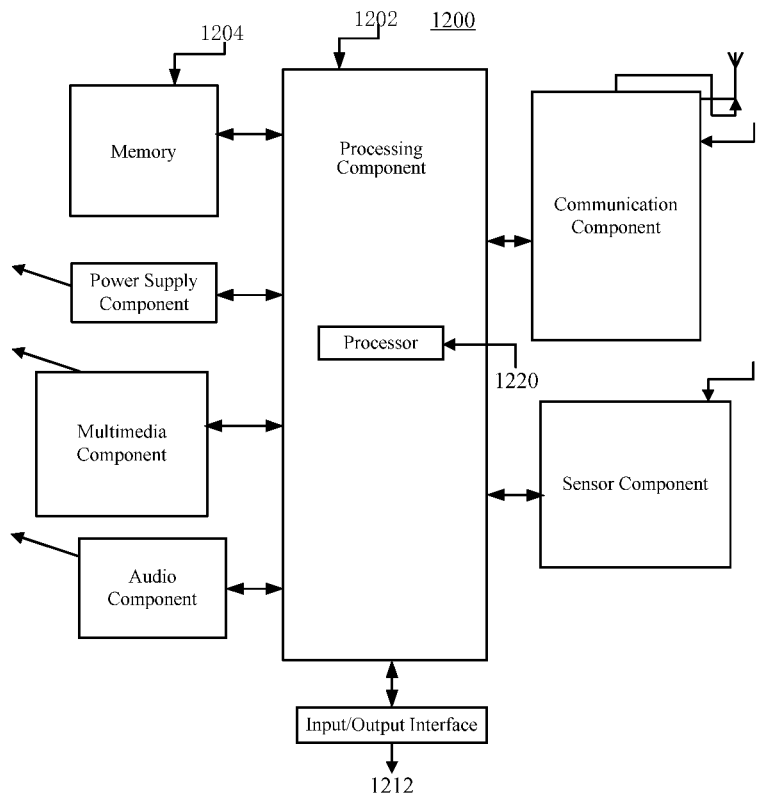
FIG. 12 is a block diagram showing a slot format indication apparatus according to an exemplary embodiment.

FIG. 12 is a block diagram of a slot format indication device 1200 according to an exemplary embodiment. The slot format indication device 1200 is suitable for terminals. The slot format indication device 1200 may include one or more of the following components: a processing component 1202, a memory 1204, a power supply component 1206, a multimedia component 1208, an audio component 1210, and an input/output (I/O) interface 1212, a sensor component 1214, and a communication component 1216.

The processing component 1202 generally controls overall operations of the slot format indication device 1200, such as operations associated with display, telephone calls, data communications, camera operations, and recording operations. The processing component 1202 may include one or more processors 1220 to execute instructions, so as to complete all or part of the steps of the foregoing method. In addition, the processing component 1202 may include one or more modules to facilitate the interaction between the processing component 1202 and other components. For example, the processing component 1202 may include a multimedia module to facilitate the interaction between the multimedia component 1208 and the processing component 1202.

The memory 1204 is configured to store various types of data to support operations in the slot format indication device 1200. Examples of these data include instructions for any application or method operating on the slot format indication device 1200, contact data, phone book data, messages, pictures, videos, etc. The memory 1204 may be implemented by any type of volatile or non-volatile storage device or a combination thereof, such as Static Random-Access Memory (SRAM), Electrically Erasable Programmable Read-Only Memory (EEPROM), Erasable Programmable Read-Only Memory (EPROM), Programmable Read-Only Memory (PROM), Read-Only Memory (ROM), magnetic memory, flash memory, magnetic disk or optical disk.

The power supply component 1206 provides power for various components of the slot format indication device 1200. The power supply component 1206 may include a power supply management system, one or more power supplies, and other components associated with the generation, management, and distribution of power for the slot format indication device 1200.

The multimedia component 1208 includes a screen that provides an output interface between the slot format indication device 1200 and the user. In some embodiments, the screen may include a Liquid Crystal Display (LCD) and a Touch Panel (TP). If the screen includes a touch panel, the screen may be implemented as a touch screen to receive input signals from the user. The touch panel includes one or more touch sensors to sense touch, sliding, and gestures on the touch panel. The touch sensor may not only sense the boundary of a touch operation or a slide operation, but also detect duration and pressure related to the touch or slide operation. In the embodiment of the present application, the multimedia component 1208 includes a front camera and/or a rear camera. When the slot format indication device 1200 is in an operation mode, such as a shooting mode or a video mode, the front camera and/or the rear camera can receive external multimedia data. Each front camera and rear camera can be a fixed optical lens system or have focal length and optical zoom ability.

The audio component 1210 is configured to output and/or input audio signals. For example, the audio component 1210 includes a microphone (MIC). When the slot format indication device 1200 is in an operation mode, such as a call mode, a recording mode, and a voice recognition mode, the microphone is configured to receive an external audio signal. The received audio signal can be further stored in the memory 1204 or sent via the communication component 1216. In the embodiment of the present application, the audio component 1210 further includes a speaker for outputting audio signals.

The I/O interface 1212 provides an interface between the processing component 1202 and a peripheral interface module. The above-mentioned peripheral interface module may be a keyboard, a click wheel, a button, and the like. These buttons may include but are not limited to a home button, a volume button, a start button, and a lock button.

The sensor component 1214 includes one or more sensors for providing the slot format indication device 1200 with various aspects of state evaluation. For example, the sensor component 1214 can detect the on/off status of the slot format indication device 1200 and the relative positioning of the components. For example, the component is the display and the keypad of the slot format indication device 1200. The sensor component 1214 can also detect the slot format indication device 1200, position change of any of the components in slot format indication device 1200, the presence or absence of contact between the user and the slot format indication device 1200, the orientation or acceleration/deceleration of the slot format indication device 1200, and the temperature change of the slot format indication device 1200. The sensor component 1214 may include a proximity sensor configured to detect the presence of nearby objects when there is no physical contact. The sensor component 1214 may also include a light sensor for use in imaging applications, such as a Complementary Metal Oxide Semiconductor (CMOS) image sensor or a Charge-coupled Device (CCD) image sensor. In the embodiment of the present application, the sensor component 1214 may also include an acceleration sensor, a gyroscope sensor, a magnetic sensor, a pressure sensor or a temperature sensor.

The communication component 1216 is configured to facilitate wired or wireless communication between the slot format indication device 1200 and other devices. The slot format indication device 1200 can access a wireless network based on a communication standard, such as WiFi, an operator network (such as 2G, 3G, 4G, or 5G), or a combination thereof. In an exemplary embodiment, the communication component 1216 receives a broadcast signal or broadcast related information from an external broadcast management system via a broadcast channel. In this embodiment of the present application, the communication component 1216 further includes a Near Field Communication (NFC) module to facilitate short-range communication. For example, the NFC module can be implemented based on Radio Frequency Identification (RFID) technology, Infrared Data Association (IrDA) technology, Ultra Wide Band (UWB) technology, Bluetooth (BT) technology and other Technology.

In an exemplary embodiment, the slot format indication device 1200 may be implemented by one or more Application Specific Integrated Circuits (ASIC), Digital Signal Processor (DSP), and Digital Signal Processor Device (DSPD), Programmable Logic Device (PLD), Field Programmable Gate Array (FPGA), controller, microcontroller, microprocessor or other electronic components, in order to perform the above methods.

In the embodiment of the present application, there is also provided a non-transitory computer-readable storage medium having instructions, such as the memory 1204 including instructions, which can be executed by the processor 1220 of the slot format indication device 1200 to complete the foregoing method. For example, the non-transitory computer-readable storage medium may be ROM, Random Access Memory (RAM), Compact Disc Read-Only Memory (CD-ROM), magnetic tape, floppy disk, and optical data storage device, etc.

When the instructions in the storage medium are executed by the processor, the slot format indication device 1200 can execute the following methods, which include: receiving downlink control information (DCI) sent by a base station, wherein the DCI comprises slot format indications (SFIs) of target LBT bandwidth units (LBT BW units), and the target LBT BW units comprises LBT BW units, corresponding channels of which are idle, from among respective LBT BW units included in an active bandwidth part (BWP) in a target serving cell corresponding to the terminal; and
    determining numbers and SFIs of the target LBT BW units according to the DCI.

In some embodiments, the receiving the DCI sent by the base station may include: detecting the DCI on at least one LBT BW unit included in the active BWP in the target serving cell corresponding to the terminal; wherein the DCI comprises idle channel indications and SFIs of all LBT BWs, corresponding channels of which are idle, in the target serving cell, and the idle channel indications are used to characterize whether channels respectively corresponding to all LBT BW units in the target serving cell are idle or not. The determining numbers and SFIs of the target LBT BW units according to the DCI may include: in response to that the DCI is detected on any one of LBT BW units included in the active BWP, according to the idle channel indications and the SFIs included in the DCI, determining numbers (Nos.) and SFIs of LBT BW units, corresponding channels of which are idle, from among respective LBT BW units included in the active BWP as numbers and SFIs of the target LBT BW units.

In some embodiments, the receiving the DCI sent by the base station may include: detecting the DCI on each LBT BW unit included in the active BWP in the target serving cell corresponding to the terminal. The determining numbers and SFIs of the target LBT BW units according to the DCI may include: in response to that the DCI is detected on any one of LBT BW units included in the active BWP, determining number (No.) of a LBT BW units that detects the DCI as numbers (Nos.) of the target LBT BW units and determining SFIs included in the DCI as SFIs of the target LBT BW units, wherein, the DCI comprises SFIs of the LBT BW units that detect the DCI.

In some embodiments, the method further includes receiving an indication message sent by the base station, wherein the indication message indicates bandwidth positions and numbers of respective LBT BW units included in the active BWP in the target serving cell corresponding to the terminal.

Figure 13:
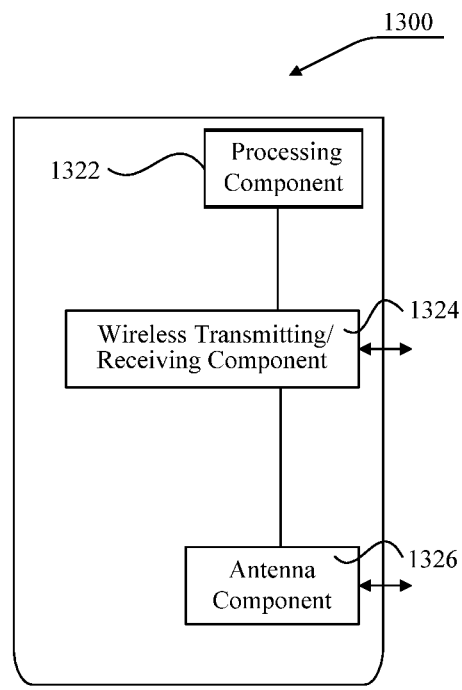
FIG. 13 is a block diagram showing a slot format indication apparatus according to an exemplary embodiment.

FIG. 13 is a block diagram showing a slot format indication apparatus according to an exemplary embodiment. As shown in FIG. 13, the slot format indication apparatus 1300 may be provided as a base station. Referring to FIG. 13, the slot format indication apparatus 1300 includes a processing component 1322, a wireless transmitting/receiving component 1324, an antenna component 1326, and the signal processing part specific to the wireless interface. The processing component 1322 may further include one or more processors.

One of the processors in the processing component 1322 may be configured to execute the following methods, and the methods include: after performing Listen Before Talk (LBT) on an active bandwidth part (BWP) in a target serving cell corresponding to a terminal, determining target LBT bandwidth units (LBT BW units), corresponding channels of which are idle, from among respective LBT bandwidth units included in the active BWP; and sending downlink control information (DCI) to the terminal, wherein the DCI comprises slot format indications (SFIs) of the target LBT BW units.

In some embodiments, the sending DCI to the terminal may include repeatedly sending the DCI to the terminal on at least one LBT BW unit included in the target LBT BW units; wherein the DCI comprises idle channel indications and SFIs of all LBT BW units, corresponding channels of which are idle, in the target serving cell, and wherein the idle channel indications are used to characterize whether channels respectively corresponding to all LBT BW units in the target serving cell are idle or not.

In some embodiments, the sending DCI to the terminal may include respectively sending a corresponding DCI to the terminal on each LBT BW unit included in the target LBT BW units, wherein the corresponding DCI comprises an SFI of a LBT BW unit that carries said corresponding DCI.

In some embodiments, the method further includes before performing LBT on the active BWP in the target serving cell corresponding to the terminal, sending an indication message to the terminal, wherein the indication message indicates bandwidth positions and numbers of respective LBT BW units included in the active BWP in the target serving cell corresponding to the terminal.

The technical solution provided by the embodiment of the present disclosure may include the following beneficial effects: in the technical solution, by means of indicating SFIs based on LBT channel detection bandwidth units, and notifying the terminal that channels corresponding to which of the LBT BW units are idle, the terminal is capable of obtaining explicit SFIs and applicable LBT BW units, and the clear indication of the slot format is realized, thus improving the reliability of the system.

After considering the specification and practicing the invention disclosed herein, those skilled in the art will easily think of other embodiments of the present application. This application is intended to cover any variations, uses, or adaptive changes of this application. These variations, uses, or adaptive changes follow the general principles of this application and include common knowledge or customary technical means in the technical field not disclosed in this application. The Specification and embodiments are only regarded as exemplary, and the true scope and spirit of the application are pointed out by the following claims.

It should be understood that the present application is not limited to the precise structure that has been described above and shown in the drawings, and various modifications and changes can be made without departing from its scope. The scope of the application is only limited by the appended claims.

What is claimed is:

1. A slot format indication method, comprising:
performing, by a base station, Listen Before Talk (LBT) on an active bandwidth part (BWP) in a target serving cell corresponding to a terminal;
determining, by the base station, target LBT bandwidth units (LBT BW units), corresponding channels of which are idle, from respective LBT bandwidth units included in the active BWP; and
sending downlink control information (DCI) to the terminal, wherein the DCI comprises slot format indications (SFIs) of the target LBT BW units;
wherein sending the DCI to the terminal comprises:
repeatedly sending the DCI to the terminal on at least one LBT BW unit included in the target LBT BW units,
wherein the DCI comprises idle channel indications and SFIs of all LBT BW units corresponding channels of which are idle, in the target serving cell, and wherein the idle channel indications indicate whether channels respectively corresponding to all LBT BW units in the target serving cell are idle or not.

2. The method according to claim 1, further comprising:
sending an indication message to the terminal, wherein the indication message indicates bandwidth positions and numbers of respective LBT BW units included in the active BWP in the target serving cell corresponding to the terminal.

3. A slot format indication method, comprising:
receiving, by a terminal, downlink control information (DCI) sent by a base station, wherein the DCI comprises slot format indications (SFIs) of target LBT bandwidth units (LBT BW units), and the target LBT BW units comprise LBT BW units, corresponding channels of which are idle, from respective LBT BW units included in an active bandwidth part (BWP) in a target serving cell corresponding to the terminal; and
determining, by the terminal, numbers and SFIs of the target LBT BW units according to the DCI;
wherein receiving the DCI sent by the base station comprises:
detecting the DCI on at least one LBT BW unit included in the active BWP in the target serving cell corresponding to the terminal,
wherein the DCI comprises idle channel indications and SFIs of all LBT BWs, corresponding channels of which are idle, in the target serving cell, and the idle channel indications indicate whether channels respectively corresponding to all LBT BW units in the target serving cell are idle or not,
wherein determining the numbers and the SFIs of the target LBT BW units according to the DCI comprises:
in response to detecting the DCI on any one of LBT BW units included in the active BWP, determining, according to the idle channel indications and the SFIs included in the DCI, numbers and SFIs of the LBT BW units, corresponding channels of which are idle, from respective LBT BW units included in the active BWP as the numbers and the SFIs of the target LBT BW units.

4. The method according to claim 3, further comprising:
receiving an indication message sent by the base station, wherein the indication message indicates bandwidth positions and numbers of respective LBT BW units included in the active BWP in the target serving cell corresponding to the terminal.

5. A slot format indication device, for executing the slot format indication method according to claim 1, comprising:
a processor;
memory for storing instructions executable by the processor;
wherein, the processor is configured to:
perform Listen Before Talk (LBT) on an active bandwidth part (BWP) in a target serving cell corresponding to a terminal, determine target LBT bandwidth units (LBT BW units), corresponding channels of which are idle, from respective LBT bandwidth units included in the active BWP; and
send downlink control information (DCI) to the terminal, wherein the DCI comprises slot format indications (SFIs) of the target LBT BW units;
wherein the processor is configured to repeatedly send the DCI to the terminal on at least one LBT BW unit included in the target LBT BW units,
wherein the DCI comprises idle channel indications and SFIs of all LBT BW units corresponding channels of which are idle, in the target serving cell, and wherein the idle channel indications indicate whether channels respectively corresponding to all LBT BW units in the target serving cell are idle or not.

6. A slot format indication device, which is applied to a terminal, comprising:
a processor;
memory for storing instructions executable by the processor;

wherein, the processor is configured to:
receive downlink control information (DCI) sent by a base station, wherein the DCI comprises slot format indications (SFIs) of target LBT bandwidth units (LBT BW units), and the target LBT BW units comprise LBT BW units, corresponding channels of which are idle, from respective LBT BW units included in an active bandwidth part (BWP) in a target serving cell corresponding to the terminal; and
determine numbers and SFIs of the target LBT BW units according to the DCI;
wherein the processor is configured to detect the DCI on at least one LBT BW unit included in the active BWP in the target serving cell corresponding to the terminal,
wherein the DCI comprises idle channel indications and SFIs of all LBT BWs, corresponding channels of which are idle, in the target serving cell, and the idle channel indications indicate whether channels respectively corresponding to all LBT BW units in the target serving cell are idle or not,
wherein the processor is further configured to, in response to detecting the DCI on any one of LBT BW units included in the active BWP, determine, according to the idle channel indications and the SFIs included in the DCI, numbers and SFIs of the LBT BW units, corresponding channels of which are idle, from respective LBT BW units included in the active BWP as the numbers and the SFIs of the target LBT BW units.

7. The slot format indication device according to claim 6, wherein the processor is configured to receive an indication message sent by the base station, and
wherein the indication message indicates bandwidth positions and numbers of respective LBT BW units included in the active BWP in the target serving cell corresponding to the terminal.

8. A computer-readable storage medium, wherein at least one instruction is stored in the computer-readable storage medium, and the instruction is loaded and executed by a processor to implement operations in the slot format indication method according to claim 1.

9. A computer-readable storage medium, wherein at least one instruction is stored in the computer-readable storage medium, and the instruction is loaded and executed by a processor to implement operations in the slot format indication method according to claim 3.

* * * * *